(12) United States Patent
Frederick et al.

(10) Patent No.: US 12,089,054 B2
(45) Date of Patent: Sep. 10, 2024

(54) COMPLEX COMPOSITE TOKENS

(71) Applicant: eBay Inc., San Jose, CA (US)

(72) Inventors: Gail Anna Rahn Frederick, Portland, OR (US); Tatjana Vlahovic, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/227,623

(22) Filed: Jul. 28, 2023

(65) Prior Publication Data

US 2023/0370852 A1 Nov. 16, 2023

Related U.S. Application Data

(63) Continuation of application No. 17/977,628, filed on Oct. 31, 2022, now Pat. No. 11,758,406, which is a
(Continued)

(51) Int. Cl.
*H04W 12/60* (2021.01)
*G06F 21/62* (2013.01)
(Continued)

(52) U.S. Cl.
CPC ........ *H04W 12/66* (2021.01); *G06F 21/6245* (2013.01); *H04L 9/3255* (2013.01); *H04L 63/0869* (2013.01); *H04L 63/0884* (2013.01)

(58) Field of Classification Search
CPC .. H04W 12/66; G06F 21/6245; H04L 9/3255; H04L 63/0869; H04L 63/0884
(Continued)

(56) References Cited

U.S. PATENT DOCUMENTS 9,077,707 B2 7/2015 Vrancken et al.
9,338,007 B1 5/2016 Doshi
(Continued)

FOREIGN PATENT DOCUMENTS

CN 101188577 A 5/2008
CN 101473340 A 7/2009
(Continued)

OTHER PUBLICATIONS

Heo et al., "How to divide a permission token in the delegation process of blockchain-based access control for IoT," 2022 IEEE International Systems Conference (SysCon), Montreal, QC, Canada, 2022, pp. 1-8, doi: 10.1109/SysCon53536.2022.9773848. (Year: 2022).*
(Continued)

*Primary Examiner* — Peter C Shaw
(74) *Attorney, Agent, or Firm* — Shook, Hardy & Bacon L.L.P.

(57) ABSTRACT

Technologies are shown for trust delegation that involve receiving a first request from a subject client and responding by sending a first token having first permissions to the subject client. A second request from a first partner actor is received that includes the first token, and in response, the first partner actor is linked to the subject client in a trust stack and a second token is sent to the first actor with second permissions, the second token identifying the subject client and the first partner actor. A third request from a second partner actor is received that includes the second token, and in response, the second partner actor is linked to the first partner actor in the trust stack and a third token is sent to the second partner actor with third permissions, the third token identifying the first partner actor and the second partner actor.

20 Claims, 9 Drawing Sheets

Related U.S. Application Data continuation of application No. 17/332,770, filed on May 27, 2021, now Pat. No. 11,553,352, which is a continuation of application No. 16/288,689, filed on Feb. 28, 2019, now Pat. No. 11,057,778.

(51) Int. Cl.
*H04L 9/32* (2006.01)
*H04L 9/40* (2022.01)

(58) Field of Classification Search
USPC .......................................................... 726/4
See application file for complete search history.

(56) References Cited

U.S. PATENT DOCUMENTS

| | | | |
|---|---|---|---|
| 9,626,137 B2 | 4/2017 | Mihara | |
| 9,819,672 B1* | 11/2017 | Machani | H04L 63/0853 |
| 10,509,898 B2* | 12/2019 | Csinger | H04L 9/085 |
| 11,057,778 B2 | 7/2021 | Frederick et al. | |
| 11,553,352 B2 | 1/2023 | Frederick et al. | |
| 11,750,598 B2 | 9/2023 | Frederick et al. | |
| 11,758,406 B2 | 9/2023 | Frederick et al. | |
| 2005/0015591 A1* | 1/2005 | Thrash | G06F 21/6218 713/166 |
| 2007/0244746 A1 | 10/2007 | Issen et al. | |
| 2009/0171754 A1 | 7/2009 | Kane et al. | |
| 2011/0041168 A1 | 2/2011 | Murray et al. | |
| 2012/0331536 A1* | 12/2012 | Chabbewal | H04L 63/0815 726/3 |
| 2013/0110675 A1* | 5/2013 | Bouw | G06Q 30/04 705/26.8 |
| 2013/0144755 A1 | 6/2013 | Mowatt et al. | |
| 2013/0325579 A1 | 12/2013 | Salmon et al. | |
| 2015/0254656 A1* | 9/2015 | Bondesen | G06Q 20/36 705/41 |
| 2015/0339703 A1 | 11/2015 | Karlin et al. | |
| 2017/0331791 A1 | 11/2017 | Wardell et al. | |
| 2018/0020005 A1 | 1/2018 | Beiter et al. | |
| 2020/0250694 A1 | 8/2020 | Mock et al. | |
| 2020/0280846 A1 | 9/2020 | Frederick et al. | |
| 2020/0314087 A1* | 10/2020 | Zeck | G06F 3/0482 |
| 2021/0021591 A1 | 1/2021 | Frederick et al. | |
| 2021/0289363 A1 | 9/2021 | Frederick et al. | |
| 2023/0052525 A1 | 2/2023 | Frederick et al. | |
| 2023/0353558 A1 | 11/2023 | Frederick et al. | |

FOREIGN PATENT DOCUMENTS

| | | | | |
|---|---|---|---|---|
| CN | 102611709 A | * | 7/2012 | |
| CN | 102724647 A | | 10/2012 | |
| CN | 104144416 A | | 11/2014 | |
| CN | 104255007 A | | 12/2014 | |
| CN | 104641345 A | | 5/2015 | |
| WO | WO-2017004373 A1 | * | 1/2017 | ........... G06Q 20/383 |
| WO | 2020/176138 A1 | | 9/2020 | |

OTHER PUBLICATIONS

Claeys et al., "Securing Complex IoT Platforms with Token Based Access Control and Authenticated Key Establishment," 2017 International Workshop on Secure Internet of Things (SIoT), Oslo, Norway, 2017, pp. 1-9, doi: 10.1109/SIoT.2017.00006. (Year: 2017).*

Fotiou et al., "Access control delegation for the cloud," 2014 IEEE Conference on Computer Communications Workshops (INFOCOM Wkshps), Toronto, ON, Canada, 2014, pp. 13-18, doi: 10.1109/INFCOMW.2014.6849161. (Year: 2014).*

Ince et al., "Token-based authentication and access delegation for HW-accelerated telco cloud solution," 2022 IEEE 11th International Conference on Cloud Networking (CloudNet), Paris, France, 2022, pp. 109-117, doi: 10.1109/CloudNet55617.2022.9978865. (Year: 2022).*

Notice of Decision to Grant received for Chinese Patent Application No. 202010677731.5, mailed on Oct. 11, 2023, 4 Pages (2 Pages of English Translation and 2 Pages of official Copy only).

BRADY,"Delegation Patterns for OAuth 2.0", Retrieved from the Internet URL: <https://www.scottbrady91.com/OAuth/Delegation-Patterns-for-OAuth-20>, Sep. 27, 2018, 6 pages.

Claeys et al., "Securing Complex IoT Platforms with Token Based Access Control and Authenticated Key Establishment", International Workshop on Secure Internet of Things (SIoT), Oslo, Norway, doi: 10.1109/SIoT.2017.00006., 2017, pp. 1-9.

Fotiou et al., "Capability-based access control for multi-tenant systems using OAuth 2.0 and Verifiable Credentials", International Conference on Computer Communications and Networks (ICCCN), Athens, Greece, 10.1109/ICCCN52240.2021.9522214, 2021, 9 pages.

Hardt,"The OAuth 2.O Authorization Framework", Oct. 31, 2012, pp. 1-76.

Jones et al., "OAuth 2.0 Token Exchange", OAuth Working Group, Retrieved from Internet URL:https://tools.ietf.org/html/draft-ietf-oauth-token-exchange-16, Oct. 19, 2018, 1-34 pages.

Jones et al., "OAuth 2.OToken Exchange", Oct. 19, 2018, 39 pages.

Pai et al., "Formal Verification of OAuth 2.0 Using Alloy Framework", International Conference on Communication Systems and Network Technologies, Katra, India, doi: 10.1109/CSNT.2011.141, 2011, pp. 655-659.

Riabi et al., "Blockchain based OAuth for IoT", 10th IFIP International Conference on Performance Evaluation and Modeling in Wireless and Wired Networks (PEMWN), Ottawa, ON, Canada, doi: 10.23919/PEMWN53042.2021.9664701., 2021, 7 pages.

Tanvi et al., "Token Based Authentication Using Mobile Phone", International Conference on Communication Systems and Network Technologies, Katra, India, doi: 10.1109/CSNT.2011.24., 2011, pp. 85-88.

* cited by examiner

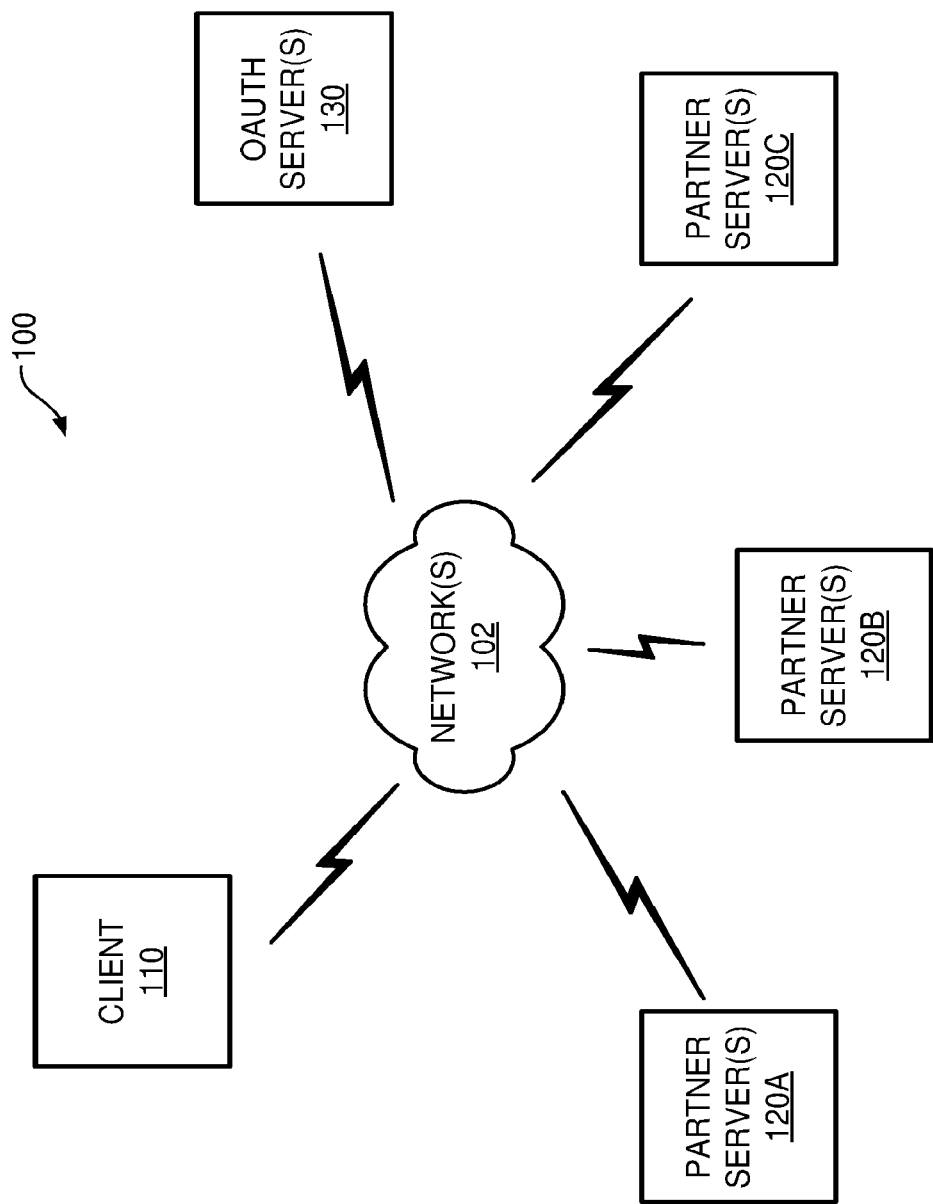

COMPLEX COMPOSITE TOKENS

CROSS-REFERENCE TO RELATED APPLICATIONS

This patent application is a continuation of U.S. patent application Ser. No. 17/977,628, filed Oct. 31, 2022, which is a continuation of U.S. patent application Ser. No. 17/332,770, filed May 27, 2021 (issued as U.S. Pat. No. 11,553,352), which is a continuation of U.S. patent application Ser. No. 16/288,689, filed Feb. 28, 2019 (issued as U.S. Pat. No. 11,057,778). Each of the aforementioned applications is herein incorporated by reference in its entirety for all purposes.

BACKGROUND

Currently, many services provide Application Programming Interfaces (APIs) through which partner entities are integrated. A transaction platform can have multiple integrated partners that provide services or goods for customer transactions through platform APIs.

For instance, a platform may have partners who accept credit cards or sensitive information from their customers. A customer's sensitive information (e.g. credit card or personal identification data) is provided to the API of a service through a partner provider (e.g. a Payment Card Industry Data Security Standard (PCI DSS) compliant vault or Health Insurance Portability and Accountability Act (HIPPA) compliant service) that maintains the sensitive information.

However, PCI DSS or HIPPA compliance can be complex and expensive to implement. Frequently, PCI DSS or HIPPA compliance is delegated to a compliant partner, which then participates in a transaction (e.g. a purchase or data transfer). This approach involves customers or users sharing their OAuth tokens with these compliant partners in order to perform a transaction. Sharing a token introduces security risk and prevents auditing the use of the token to accurately identify an entity participating in a transaction.

Typically, sharing an OAuth token involves the partner impersonating another entity, such as the customer. The impersonating entity appears to the API to be the customer because the token identifies only the customer. Sharing the token creates a security risk. Impersonation of the customer prevents the token from being used to identify the impersonating entity as participating in the transaction and, therefore, limits the auditability of the transaction.

It is with respect to these and other considerations that the disclosure made herein is presented.

SUMMARY

The disclosed technology is directed toward advanced security networking protocol extensions and APIs that can extend composite tokens described in a recent OAuth proposal for delegating permissions from a subject entity to an actor entity to create trust stacks that provide for complex delegations of permissions that can be audited and verified.

In certain simplified examples of the disclosed technologies, methods, systems or computer readable media for trust or authorization delegation for extension of OAuth multiple actor delegation in accordance with the disclosed technology involve receiving a first authorization request from a subject client and responding to the first authorization by sending a first token having a first set of permissions to the subject client. The disclosed technology also involves receiving a second authorization request from a first partner actor, the second authorization request including the first token and responding to the second authorization request by linking the first partner actor to the subject client in a trust stack pertaining to the subject client and sending a second token to the first actor partner with a second set of permissions, where the second token comprises a first complex token that identifies the subject client and the first partner actor. The technology further involves receiving a third authorization request from a second partner actor, the third authorization request including the second token and responding to the third authorization request by linking the second partner actor to the first partner actor in the trust stack, and sending a third token to the second actor partner with a third set of permissions, where the third token comprises a second complex token that identifies the first partner actor and the second partner actor.

Examples in accordance with certain aspects of the disclosed technology can further include receiving an access request to a resource from the second partner actor, the access request including the third token and granting access to the resource based on the third set of permissions. Other examples in accordance with other aspects of the disclosed technology can include determining the second set of permissions based on either a union or intersection of permissions for the subject client and permissions for the first partner actor. In still other examples, the disclosed technologies can include determining the third set of permissions based on either a union or intersection of permissions for the subject client, permissions for the first partner actor, and permissions for the third partner actor.

In certain examples, the authorization delegation pertains to a financial transaction, the first partner actor is not configured for compliance with a standard for secure handling of customer financial data, and the second partner actor is configured for compliance with the standard for secure handling of customer financial data.

In certain other examples, the subject client can be an end user, the first partner actor can be a service provider to the end user, and the second partner actor can be a subcontractor to the first partner. In certain of these examples, the second partner actor is configured to provide one or more of shipping, packaging, warehousing and insurance to the first partner.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 1 is an architectural diagram showing an illustrative example of an architecture suitable for application of the disclosed technology for complex delegation of OAuth permissions;

DETAILED DESCRIPTION

Figure 2A:
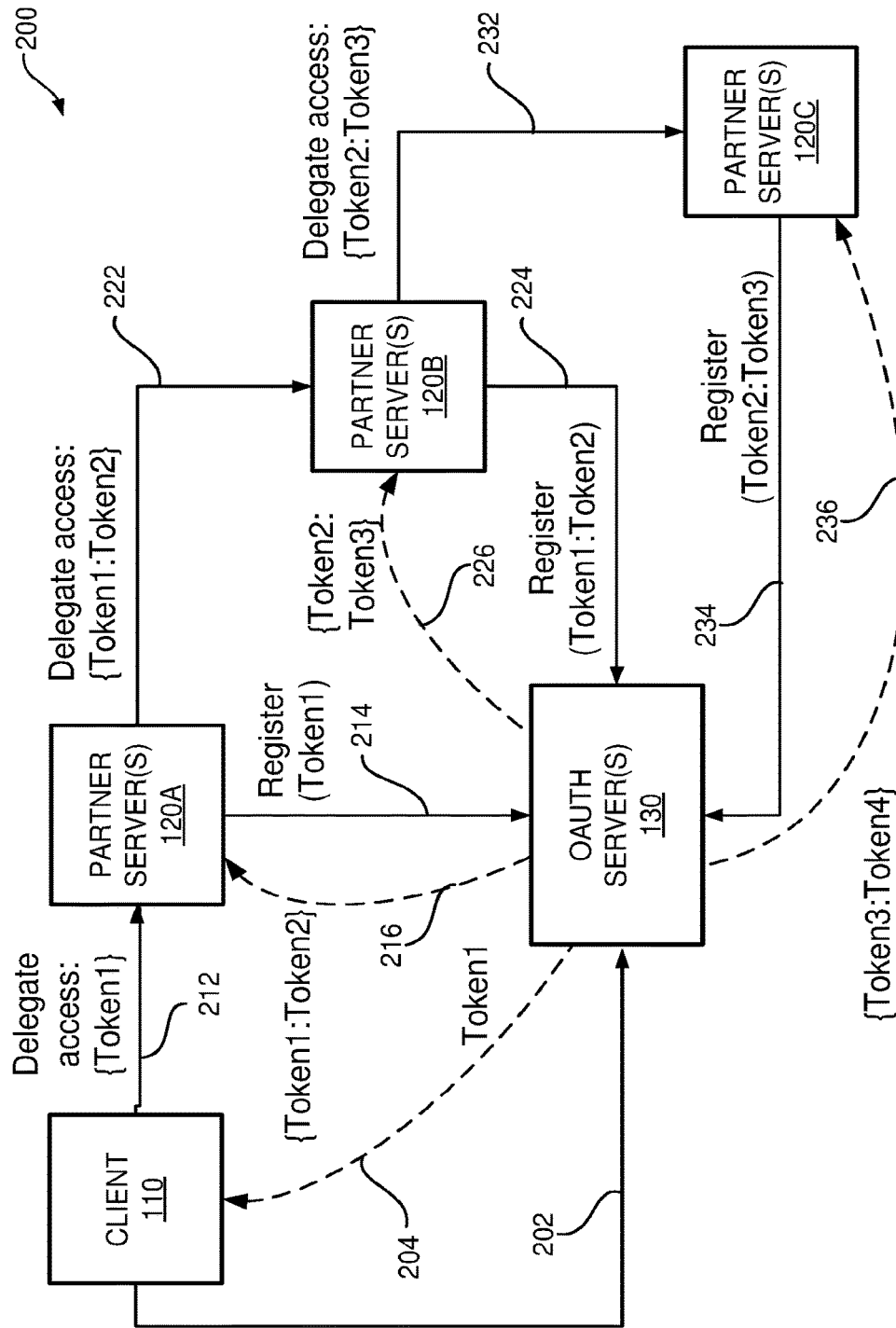
FIG. 2A is a data architecture diagram showing an illustrative example of data exchange in an application of the disclosed technology for complex delegation of OAuth permissions.

The following Detailed Description describes technologies for complex delegation of OAuth permissions. While a current OAuth proposal provides for delegation of permission from a subject entity to an actor entity using composite tokens, the disclosed technology provides for creation of a trust stack that stores permissions and relationships between multiple entities that permits traceable delegation between multiple entities using complex composite tokens.

Recently, an Internet Engineering Task Force (IETF) draft for OAuth 2.0 Token Exchange, https://tools.ietf.org/html/draft-ietf-oauth-token-exchange-16, proposed an approach that allows delegation of tokens by combining a pair of tokens into a composite token. Each composite token includes a subject token, e.g. a token for a subject entity that is buying an item or receiving sensitive data, and an actor token, e.g. a token for an actor entity, such as a payment provider or HIPPA compliant service, acting on behalf of the subject entity.

The resulting composite token of the subject and actor tokens can be used by the actor entity to act on behalf of the subject entity. The composite token provides for the subject entity to maintain its own identity separate from the actor entity and explicitly indicates that the actor is acting on behalf of the subject.

In contrast, the disclosed technology allows a chain of trust to be established for multiple delegations of permissions using complex composite tokens. This involves maintaining a trust stack that identifies the entities and tokens in each delegation and the relationships between the entities. In certain aspects of the disclosed technology, the manner in which permissions are delegated in the complex composite tokens can be controlled. The delegations of permissions can be readily audited and the entities identified using the trust stack.

In the disclosed technology, a chain can be formed using composite tokens issued by an OAuth server that maintains the association between the composite tokens and individual tokens. The following is an illustrative example of a chain of trust:

{Token 1}→{Token 1|Token 2}→{Token 2|Token 3}

In this example of a chain of trust, the access allowed to composite token {Token 2|Token 3} can also allow access to data or APIs to {Token 1} because of the chain of trust linking individual token {Token 1} to composite token {Token 2|Token 3} through composite token {Token 1|Token 2}. The OAuth service that manages the sending of complex composite token will maintain a trust stack that represents (1) the parties acting on behalf of each other within the chain of trust and (2) the call stack in the chain of trust for the transaction.

The disclosed technology can permit a platform to allow an indefinite number of N actors to participate in a transaction on the platform. In some implementations, the disclosed technology can permit the platform to coordinate sub-transactions among the N actors.

In certain examples, a variety of different solutions can be implemented for controlling the delegation of permissions in the chain of trust. For example, assume Token 1 allows API 1 to be called and Token 2 allows API 2 to be called. In some examples, the permissions associated with a composite token can be the intersection of the permissions of the individual tokens in the composite token. Thus, the composite token {Token 1|Token 2} allow only API 1 to be called.

In other examples, the permissions associated with a composite token can be the union of the permissions of the individual tokens in the composite token. In these examples, the composite token {Token 1|Token 2} allows both API 1 and API 2 to be called.

These are simplified examples and many factors may be considered in a system or method for OAuth multiple actor delegation using complex composite tokens.

Because the trust stack allows for granular permissions across different actors, it offers a technical advantage of improved security of computer systems, computer servers, and/or data centers. Further, because the trust stack data structure allows for an efficient mechanism to look up partners interacting on a transaction, so it may improve performance and processing efficiency of a machine. As just one example, an O(log(N)) look up on trust stacks may be used to discover whether a token is already in use in a trust stack (if there is an index of tokens to trust stacks), and therefore look up of partner entities operating on a transaction may be extremely fast. Because look up of the trust stack is fast, and permissions may be directly associated with security tokens, processing performance to determine permissions allowable by different entities operating on a transaction may be further improved.

As will be described in more detail herein, it can be appreciated that implementations of the techniques and technologies described herein may include the use of solid state circuits, digital logic circuits, computer components, and/or software executing on one or more input devices.

Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

By the use of the technologies described herein, a trust stack is created that stores permissions and relationships between multiple entities and permits traceable delegation between the multiple entities using complex composite tokens. Other technical effects other than those mentioned herein can also be realized from implementation of the technologies disclosed herein.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for trust delegation will be described. As will be described in more detail below with respect to the figures, there are a number of applications and services that may embody the functionality and techniques described herein.

FIG. 1 is an architectural diagram showing an illustrative example of an architecture 100 suitable for application of the disclosed technology for OAuth multiple actor delegation using complex composite tokens. In the example of FIG. 1, a client, such as a consumer's mobile client device, acting as a subject entity can communicate with partner servers 120A-C and OAuth server 130 through network 102. Partner servers 120A-C can communicate with one another and OAuth server 130 to transfer, for example, authentication data and other data relating to a transaction, such as a data transfer or a purchase transaction. OAuth server 130 can be a platform for controlling the transaction as well as managing authentication tokens for client 110 and partner server 120A-C.

FIG. 2A is a data architecture diagram showing an illustrative example of a data exchange 200 in an application of the disclosed technology for complex delegation of OAuth permissions. In this example, client 110, as a subject entity, initiates an authentication flow, at 202, to obtain an authentication token from OAuth server 130 that permits access to a computer resource, such as one or more APIs. At 204, if authentication is successful, OAuth server 130 sends Token1 to client 110. While OAuth is used in at least some embodiments, it is to be appreciated that a trust stack may be used in any security or other networking protocols.

At 212, client 110 delegates access to partner server 120A, by sending Token1 so that partner server 120A can be an actor entity for the subject entity of client 110. At 214, partner server 120A registers Token1 with OAuth server 130. In response, OAuth server 130 registers Token1, generates Token 2 for partner server 120A, and creates composite token Token1:Token2, which is provided to partner server 120A at 216. At this point, the subject entity of client 110 has delegated its permissions to the actor entity of partner server 120A in accordance with the IETF OAuth proposal discussed above.

In accordance with the disclosed technology, partner server 120A further delegates access to partner server 120B as another actor entity by sending composite token Token1:Token2 at 222. At 224, partner server 120B registers composite token Token1:Token2 with OAuth server 130. OAuth server 130 creates a chain of trust by recording the delegation indicated in composite token Token1:Token2 in a trust stack that indicates the relationship of Token2 to Token1 along with the devices associated with each of Token1 and Token2. OAuth server generates Token3 for partner server 120B, which is recorded in the trust stack along with the device associated with Token3 and indicating the relationship of Token3 to Token2, and creates a complex composite token Token2:Token3, which it sends to partner server 120B at 226.

At 232, partner server 120B further delegates access to partner server 120C as yet another actor entity by sending complex composite token Token2:Token3. Partner server 120C registers complex composite token Token2:Token3 with OAuth server 130. OAuth server 130 records the delegation indicated in complex composite token Token2:Token3 in the trust stack. OAuth server 130 generates Token4 for partner server 120C, which is recorded in the trust stack along with the device associated with Token4, e.g. partner server 120C, to indicate the relationship of Token4 to Token3, and creates complex composite token Token4:Token3, which it sends to partner server 120C at 236. Optionally, OAuth server 130 may maintain one or more indexes of the trust stack so that the trust stack(s) associated with a token is quickly identified, and the position of the token within the trust stack quickly found. It is to be appreciated that a trust stack may include simple tokens, complex tokens, and/or any combination of the types of token.

Figure 2B:
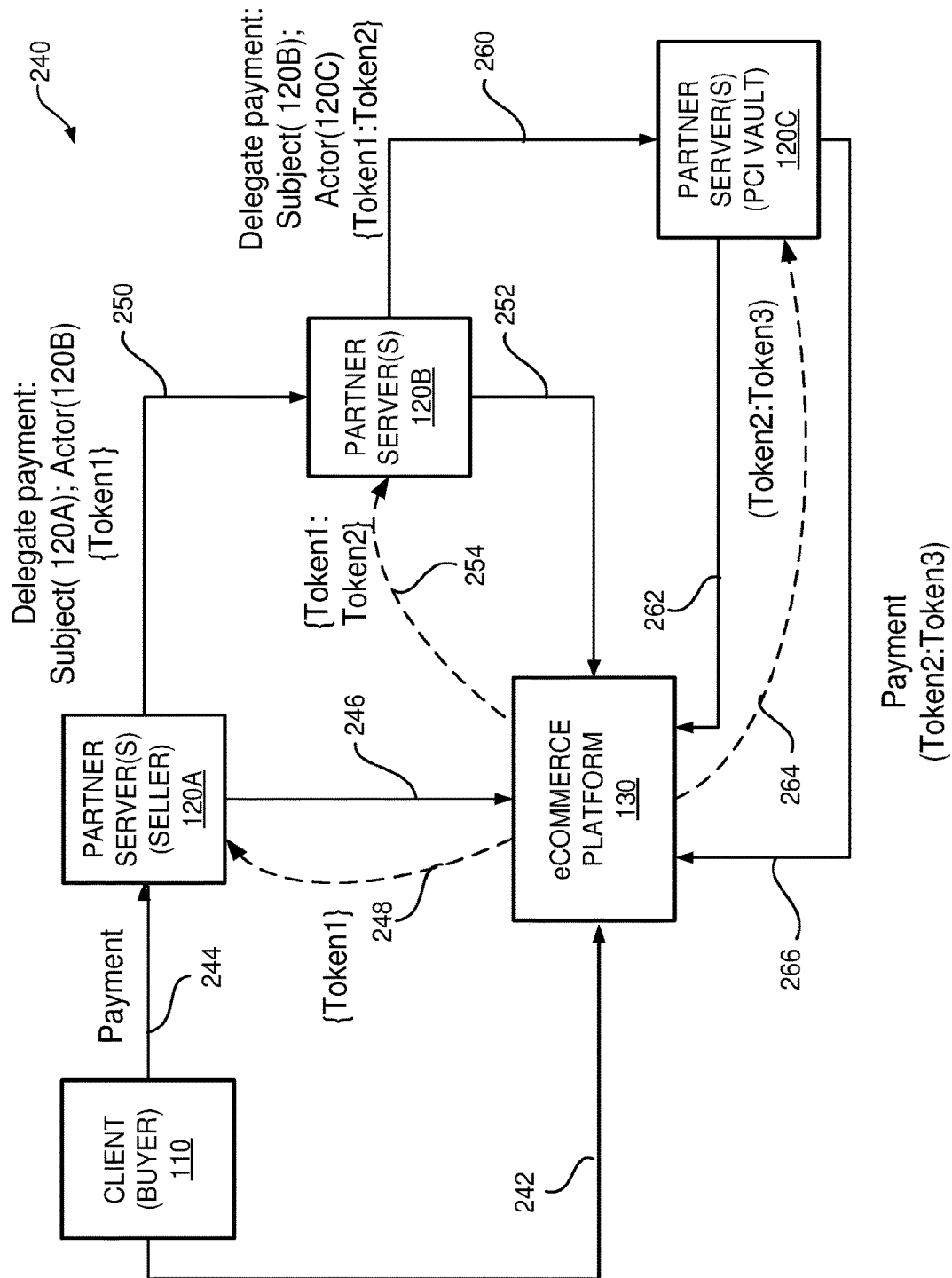
FIG. 2B is a data architecture diagram showing an illustrative example of complex delegation of permissions for a payment workflow.

FIG. 2B is a data architecture diagram showing an illustrative example of complex delegation of permissions for a payment workflow 240. In this example, at 242, a client buyer 110 initiates completion of a transaction through eCommerce platform 130, at 242, with seller partner server 120A and, at 244, tenders payment to seller partner server 120A, which is not PCI compliant. It is to be appreciated that while FIG. 2B depicts an eCommerce platform, the trust stack may be used in any web environment that requires authentication and/or authorization by various entities, and where it is desirable to store tokens allocated across entities as well as delegation of authority by one or more of those entities. As a second example, such authorization may be for storage of data in a database.

Because seller partner server 120A is not PCI compliant, it will delegate receiving payment to another partner entity that is PCI compliant. At 246, seller partner server 120A registers with eCommerce platform 130 to obtain a first access token Token1 for obtaining access to the client buyer's payment information, which is sent at 248.

At 250, seller partner server 120A delegates receipt of payment to partner server 120B, which is indicated in a complex token that identifies seller partner server 120A as the subject entity and partner server 120B as the actor entity and includes Token1. Upon receipt of the delegation, at 252, partner server 120B registers with eCommerce platform 130 and, at 254, receives complex token {Token1, Token2}.

In turn, partner server 120B, at 260, delegates payment receipt to partner server 120C, which is a PCI compliant vault that contains the payment information for client buyer 110. At 262, partner server 120C registers with eCommerce platform 130 and, at 264, receives complex token {Token2, Token3}, which grants access to partner server 120C to submit the client buyer's payment information via a payment API of eCommerce platform 130.

The payment work flow 240 of FIG. 2B illustrates one example of a payment workflow in which partner server 120C acts to obtain payment on behalf of partner seller server 120A. The delegation of trust in this scenario will be maintained by eCommerce platform 130 in a trust stack. As will be readily appreciated by one of ordinary skill in the art, many variations on this payment workflow are possible without departing from the teachings of the disclosed technology.

Figure 2C:
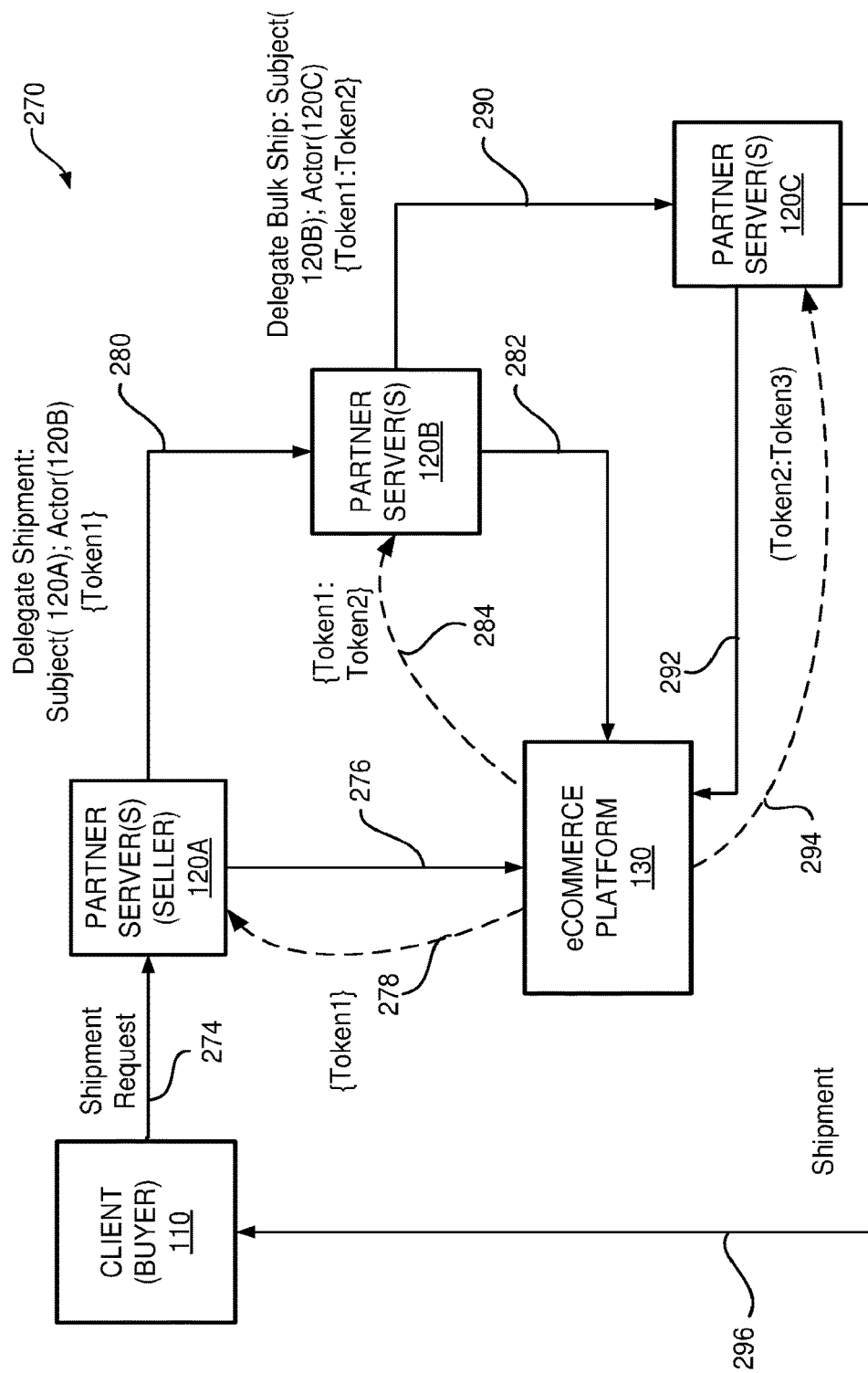
FIG. 2C is a data architecture diagram showing an illustrative example of complex delegation of permissions for a shipment workflow.

FIG. 2C is a data architecture diagram showing an illustrative example of complex delegation of permissions for a shipment workflow 270. In this scenario, seller partner server 120A delegates shipment of an item purchased by buyer client 110 to a partner servers 120B and 120C. For example, partner server 120B can obtain and pack the item and then provide it to partner server 120C for bulk shipment.

At 274, client buyer 110 sends a request to ship the item to partner seller server 120A. At 276, partner seller server 120A registers with eCommerce platform 130 and, at 278, receives access Token1. For example, access Token1 can provide access to the client buyer's home shipping information.

At 280, seller partner server 120A delegates shipment of the item to partner server 120B, e.g. a courier, packer or warehouse, which is indicated in a complex token that identifies seller partner server 120A as the subject entity and partner server 120B as the actor entity and includes Token1. At 282, partner server 120B registers with eCommerce platform 130 and, at 284, receives complex token {Token1, Token2}.

In turn, partner server 120B, at 290, delegates bulk shipment to partner server 120C. For example, partner server 120B picks and packs the item for seller partner server 120A and then delegates bulk shipment of the item to partner server 120C. At 292, partner server 120C registers with eCommerce platform 130 and, at 294, receives complex token {Token2, Token3}, which, for example, grants access to partner server 120C to obtain the client buyer's payment shipment information via a shipping API of eCommerce platform 130 and, at 296, ships the item to the client buyer's shipping address.

The payment work flow 270 of FIG. 2C illustrates one example of a shipping workflow in which partner servers 120B and 120C act on behalf of partner seller server 120A to fulfill shipment of the item purchased by client buyer 110. The delegation of trust in this scenario will be maintained by eCommerce platform 130 in a trust stack.

As will be readily appreciated by one of ordinary skill in the art, many variations on this shipping workflow are possible without departing from the teachings of the disclosed technology. For example, another partner server may be involved in insuring shipment of the item on behalf of seller partner server 120A.

In addition, the trust stack and delegation scheme of the disclosed technology can be utilized to implement a wide variety of work flow schemes. For example, the trust stack and delegation scheme can, in some examples, be combined with workflow management functionality to control and direct work flows involving complex permissions and delegations.

Figure 3A:
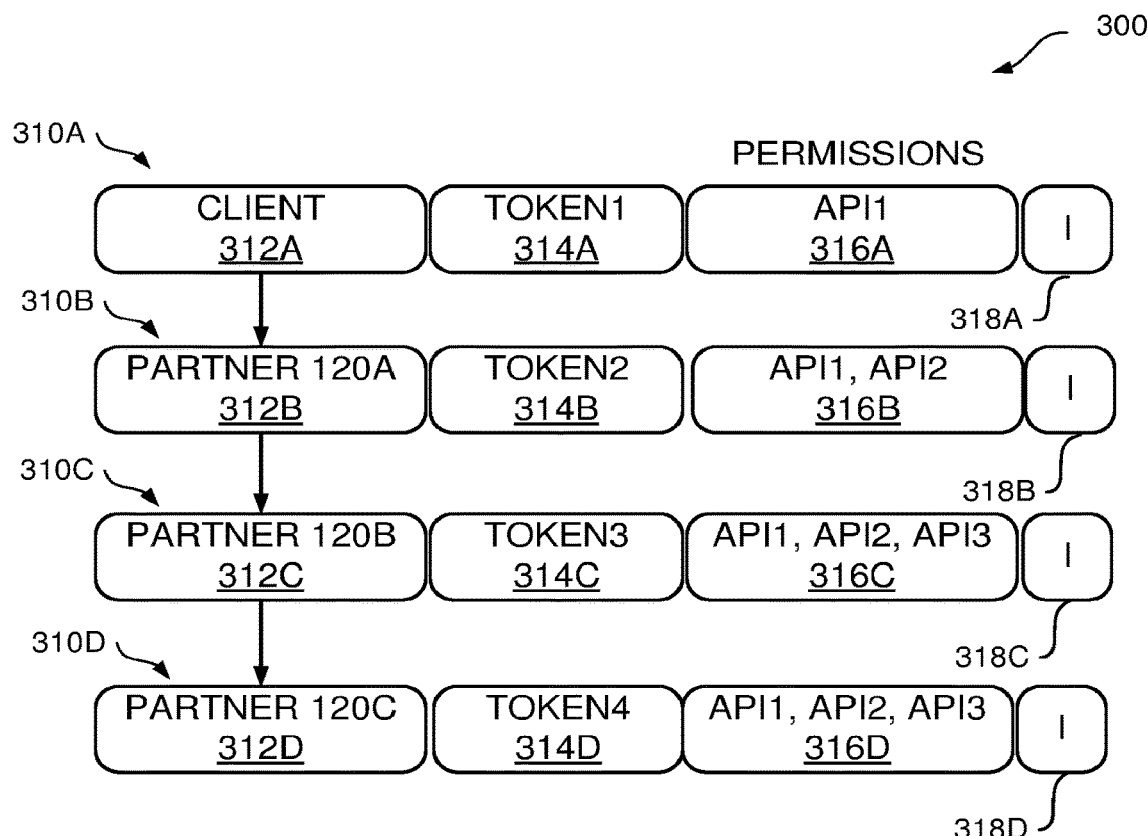
FIG. 3A is a data architecture diagram illustrating an example of a trust stack showing complex permissions relationships between entities in the application of the disclosed technology for complex delegation of OAuth permissions of FIGS. 1 and 2.

The trust stack resulting from the example of FIG. 2A is shown in FIG. 3A, which is a data architecture diagram showing an architecture 300 for a complex delegation of OAuth permissions created by the delegations illustrated in FIG. 2. In this example, each authentication layer 310 includes an identifier 312 for an authorized entity, an access token 314, a set of defined permissions 316 associated with the access token, and a permissions delegation indicator 318 indicating how delegated permissions are handled. For each delegation, the delegating layer and delegatee layer are linked or otherwise associated, e.g. in a table or list. For example, for the delegation from client 110 to partner server 120A, layer 310A, which contains the identifier for client 110 along with access Token1 and permissions associated with Token1, e.g. API1, is linked to layer 310B, which contains the identifier for partner server 120A along with access Token2 and permissions associated with Token2, e.g. API1 and API2.

Similarly, for the delegation from partner server 120A to partner server 120B, layer 310B is linked to layer 310C, which contains the identifier for partner server 120B along with access Token3 and permissions associated with Token3, e.g. API1, API2 and API3. For the delegation from partner server 120B to partner server 120C, layer 310C is linked to layer 310D, which contains the identifier for partner server 120C along with access Token4 and permissions associated with Token3, e.g. API1, API2 and API3.

The trust stack or data structure 300 is maintained in OAuth server 130, which adds a layer to the trust stack for each successful delegation. Note that the disclosed technology is not limited to the data structure shown. Also note that, depending upon the implementation and desired features, either more or less data can be incorporated into the trust stack. Also, as noted above, the trust stack and delegation scheme described herein can be combined, in some examples, with complex workflows and workflow management. It will be readily understood that a variety of data forms can be utilized to represent the multiple delegations of permissions in accordance with the disclosed technology.

Figure 3B:
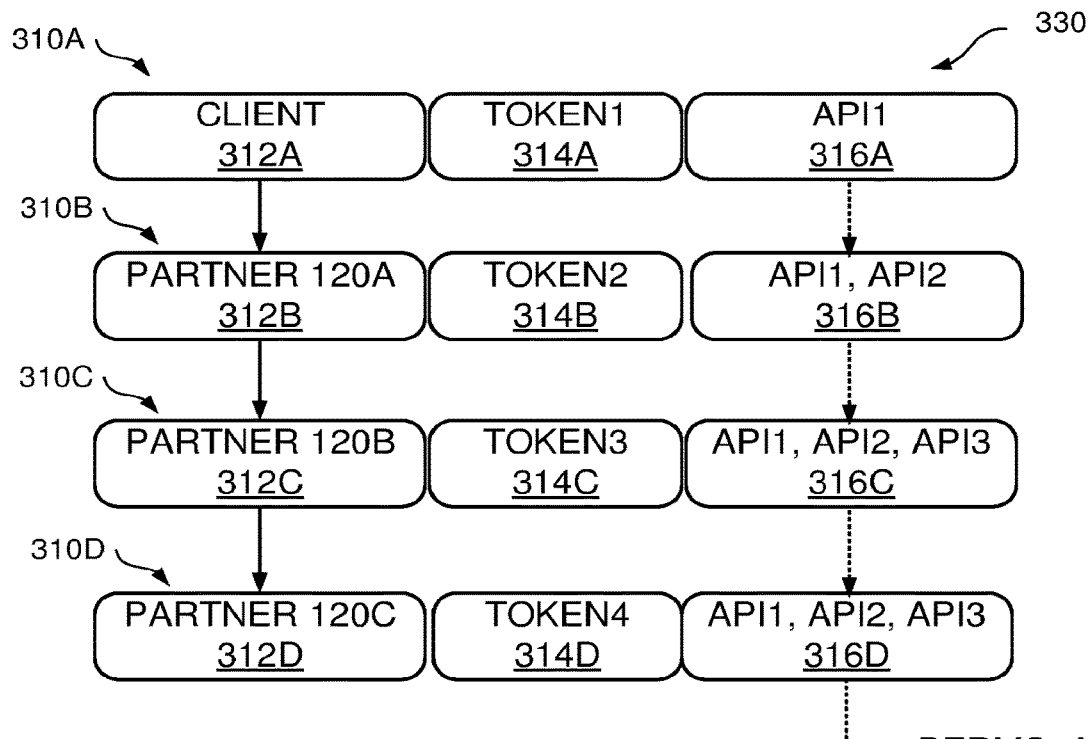
FIG. 3B is a data architecture diagram showing an illustrative example of delegation of permissions in the trust stack of FIG. 3A data exchange in an application of the disclosed technology for complex delegation of OAuth permissions.

FIG. 3B is a data architecture diagram showing an illustrative example of the delegation of permissions 330 in the trust stack 300 of FIG. 3A in an application of the disclosed technology for complex delegation of OAuth permissions. As noted above with respect to FIG. 3A, a permissions delegation indicator 318 indicating how delegated permissions are handled, e.g. by OAuth server 130, in determining which permissions have been delegated.

For example, the permissions delegation indicator 318 can indicate that only the intersection of permissions 316 granted in association with each token 314 at each level are able to be delegated. The OAuth server 130 determines the intersection of the permissions 316 of the layers in trust stack 300 to determine the permissions delegated. In the example of FIG. 3A, the only permissions common to the permissions 316A-D is API1. Thus, the permissions delegated in this scenario are limited to access to API1.

In another example, the permissions delegation indicator 318 can indicate that the union of permissions 316 granted in association with each token 314 at each level are able to be delegated. The OAuth server 130 determines the union of the permissions 316 of the layers in trust stack 300 to determine the permissions delegated to partner server 120D. In the example of FIG. 3A, all permissions included in the permissions 316A-D are delegated to partner server 120D.

Thus, the permissions delegated to partner server 120D in this scenario provide access to API1, API2 and API3.

Notably, while FIG. 3B depicts association of different permissions to different APIs in association with the tokens in the trust stack, other data may be associated with the tokens in the trust stack. For example, user profiles, or cache data may be associated with the tokens in the trust stack. Any data useful to complete a distributed transaction associated with the entities operating in the trust stack may be maintained.

Figure 4:
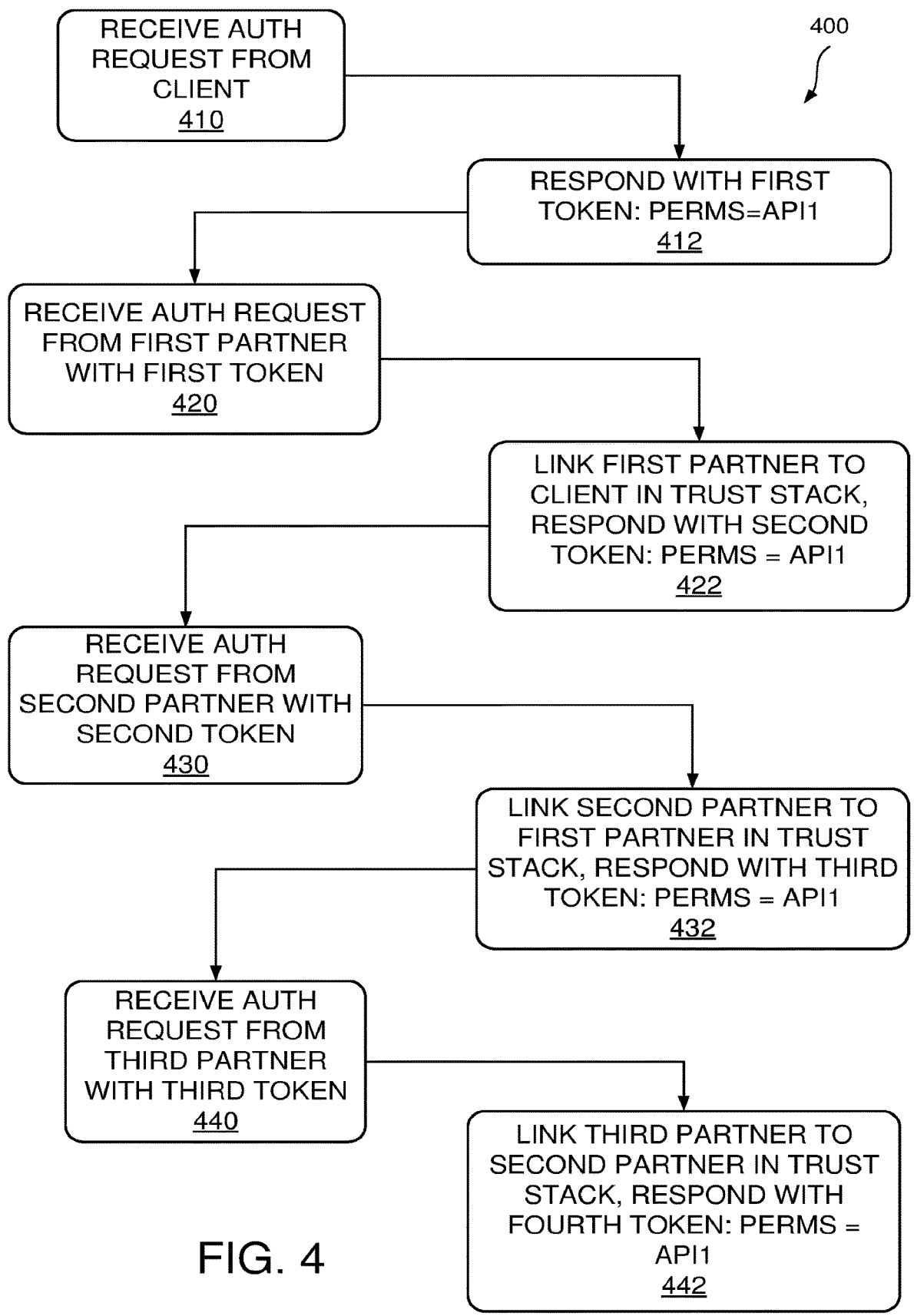
FIG. 4 is a control flow diagram showing an illustrative example of a process for complex delegation of OAuth permissions in accordance with the disclosed technology.

FIG. 4 is a control flow diagram showing an illustrative example of a process 400 for complex delegation of OAuth permissions in accordance with the disclosed technology. At 410, an authentication request is received from a client. For example, OAuth server 130 receives an authentication request from client 110 in FIG. 2A. At 412, OAuth server 130 responds with a first access token with, in this example, permission to access API1.

At 420, an authorization is received from a first partner, where the authorization request includes the first token. Because of the presence of the first token in the request, OAuth server 130 recognizes the request as a delegation from the client to the first server, e.g. client 110 to partner server 120A. At 422, OAuth server 130 links the first partner to the client in the trust stack, e.g. creates layer 310A in trust stack 300 in FIG. 3A, and responds to the authorization request from the first partner with a second token, which is a complex token that indicates the client as the subject entity and the first partner as the actor entity.

At 430, an authorization request is received from a second partner, e.g. partner server 120B that includes the second token. The presence of the second token indicates to the OAuth server 130 that the first partner has delegated to the second partner. At 432, the second partner is linked to the first partner in the trust stack, e.g. by creation of layer 310B in trust stack 300, and a third token, which is a complex token that indicates the first partner as the subject entity and the second partner as the actor entity, is generated and sent to the second partner.

At 440, an authorization request is received from a third partner that includes the third token. This indicates to the OAuth server 130 that the second partner has delegated to the third partner. At 442, the third partner is linked to the second partner in the trust stack, e.g. by creation of layer 310C in trust stack 300, and a fourth token, which is a complex token that indicates the second partner as the subject entity and the third partner as the actor entity, is generated and sent to the third partner.

The steps of process 400 can be extended to add additional layers to the trust stack representing further delegations. The OAuth server 130 maintains the trust stack, which illustrates each delegation of authority.

It should be appreciated that a variety of different instrumentalities and methodologies can be utilized to establish wireless communication as well as collect, exchange and display sensor and message data without departing from the teachings of the disclosed technology. The disclosed technology provides a high degree of flexibility and variation in the configuration of implementations without departing from the teachings of the present disclosure.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach to trust delegation. The specific examples of different aspects of trust delegation described herein are illustrative and are not intended to limit the scope of the techniques shown.

Computer Architectures for Trust Delegation

Figure 6:
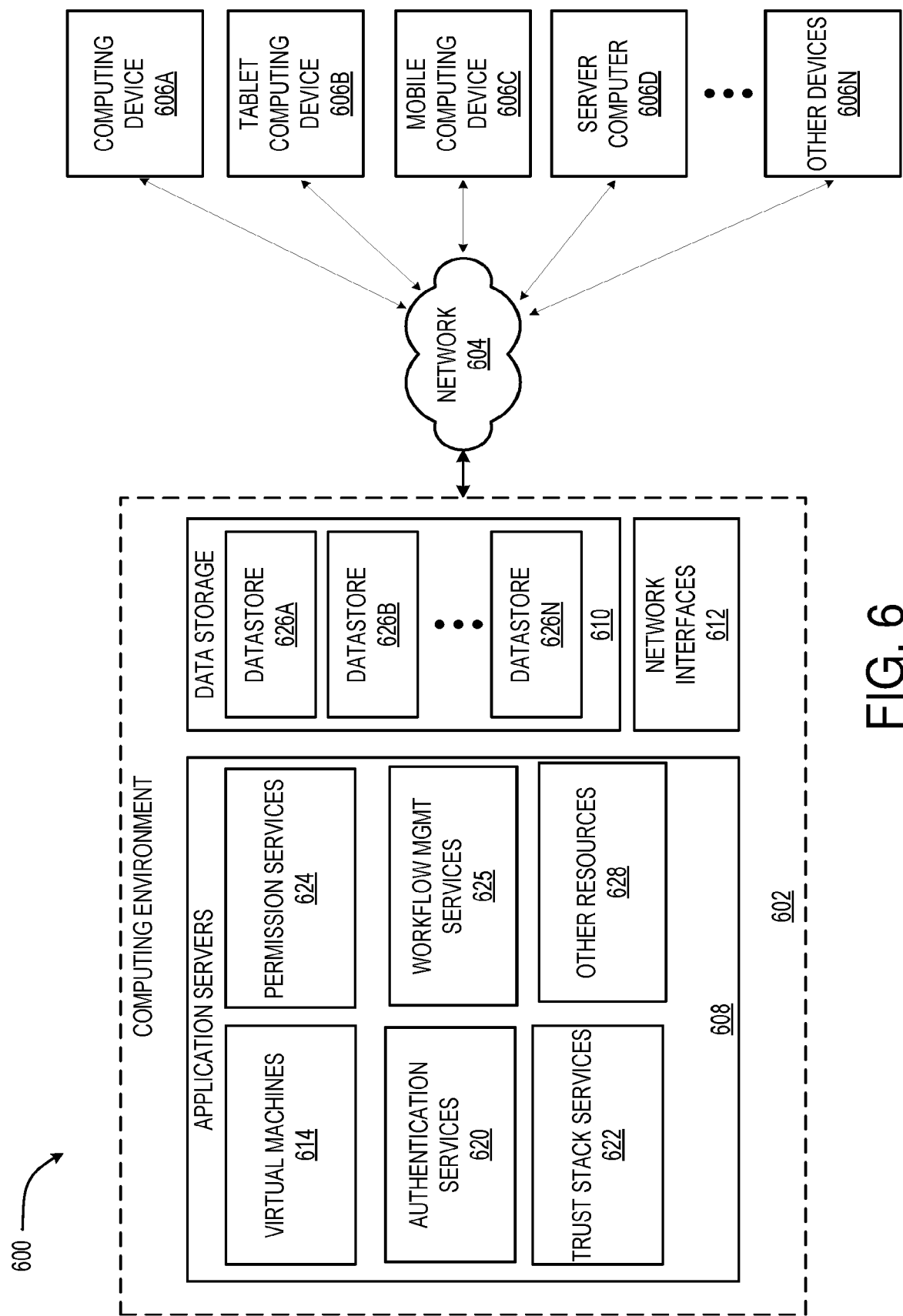
FIG. 6 is a diagram illustrating a distributed computing environment capable of implementing aspects of the techniques and technologies presented herein.

Note that at least parts of processes 400, 420, 430, 440, 450, and 460 of FIGS. 4A, 4B, 4C, 4D, 4E and 4F and other processes and operations pertaining to trust delegation described herein may be implemented in one or more servers, such as computer environment 600 in FIG. 6, or the cloud, and data defining the results of user control input signals translated or interpreted as discussed herein may be communicated to a user device for display. Alternatively, the trust delegation processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 400, 420, 430, 440, 450, and 460 of FIGS. 4A, 4B, 4C, 4D, 4E and 4F) are described herein as being implemented, at least in part, by an application, component, and/or circuit. Although the following illustration refers to the components of FIGS. 4A-F, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 420, 430, 440, 450, and 460 of FIGS. 4A, 4B, 4C, 4D, 4E and 4F) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 5:
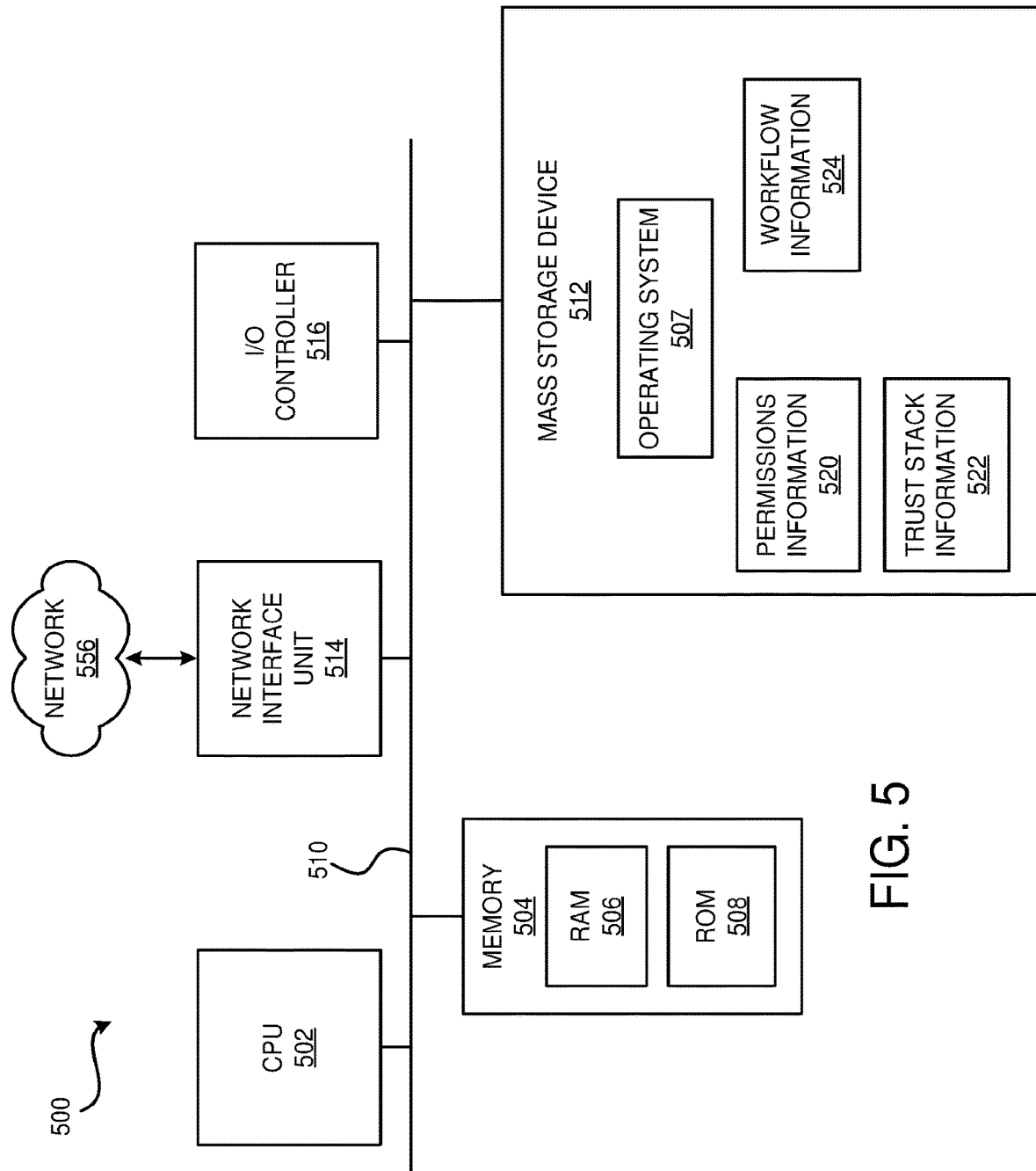
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the devices 110 and 120A-C (FIGS. 1 and 2A-C), capable of executing the program components described herein. Thus, the computer architecture 500 illustrated in FIG. 5 illustrates an architecture for an on-board vehicle computer, a server computer, mobile phone, a PDA, a smart phone, a desktop computer, a netbook computer, a tablet computer, an on-board computer, a game console, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between sub-elements within the computer architecture 500, such as during startup, is stored in the ROM 508. The computer architecture 500 further includes a mass storage device 512 for storing an operating system 507, data (such as permissions information 520, trust stack information 522, and workflow information 524), and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, game controller, television remote or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

FIG. 6 depicts an illustrative distributed computing environment 600 capable of executing the software components described herein for trust delegation. Thus, the distributed computing environment 600 illustrated in FIG. 6 can be utilized to execute many aspects of the software components presented herein. For example, the distributed computing environment 600 can be utilized to execute one or more aspects of the software components described herein.

According to various implementations, the distributed computing environment 600 includes a computing environment 602 operating on, in communication with, or as part of the network 604. The network 604 may be or may include the network 556, described above. The network 604 also can include various access networks. One or more client devices 606A-806N (hereinafter referred to collectively and/or generically as "clients 606") can communicate with the computing environment 602 via the network 604 and/or other connections (not illustrated in FIG. 6). In one illustrated configuration, the clients 606 include a computing device 606A, such as a laptop computer, a desktop computer, or other computing device; a slate or tablet computing device ("tablet computing device") 606B; a mobile computing device 606C such as a mobile telephone, a smart phone, an on-board computer, or other mobile computing device; a server computer 606D; and/or other devices 606N, which can include a hardware security module. It should be understood that any number of devices 606 can communicate with the computing environment 602. Two example computing architectures for the devices 606 are illustrated and described herein with reference to FIGS. 5 and 7. It should be understood that the illustrated devices 606 and computing architectures illustrated and described herein are illustrative only and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for trust delegation. It should be understood that this configuration is illustrative only and should not be construed as being limiting in any way.

According to various implementations, the application servers 608 also include one or more authentication services 620, trust stack services 622, permission services 624 and workflow management services 625. The authentication services 620 can include services for handling authentication requests and issuing tokens. The trust stack services 622 can include services for maintaining a trust stack indicating the trust delegation relationships between entities. The permission services 624 can include services for managing permissions granted with respect to tokens. The workflow management services 625 can includes services for defining and managing the structure of complex work flows.

As shown in FIG. 6, the application servers 608 also can host other services, applications, portals, and/or other resources ("other resources") 628. The other resources 628 can include, but are not limited to, data encryption, data sharing, or any other functionality.

As mentioned above, the computing environment 602 can include data storage 610. According to various implementations, the functionality of the data storage 610 is provided by one or more databases or data stores operating on, or in communication with, the network 604. The functionality of the data storage 610 also can be provided by one or more server computers configured to host data for the computing environment 602. The data storage 610 can include, host, or provide one or more real or virtual data stores 626A-826N (hereinafter referred to collectively and/or generically as "datastores 626"). The datastores 626 are configured to host data used or created by the application servers 608 and/or other data. Aspects of the datastores 626 may be associated with services for a trust delegation. Although not illustrated in FIG. 6, the datastores 626 also can host or store web page documents, word documents, presentation documents, data structures, algorithms for execution by a recommendation engine, and/or other data utilized by any application program or another module.

The computing environment 602 can communicate with, or be accessed by, the network interfaces 612. The network interfaces 612 can include various types of network hardware and software for supporting communications between two or more computing devices including, but not limited to, mobile client vehicles, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 may provide the software functionality described herein as a service to the clients using devices 606. It should be understood that the devices 606 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 600 to utilize the functionality described herein for trust delegation, among other aspects.

Figure 7:
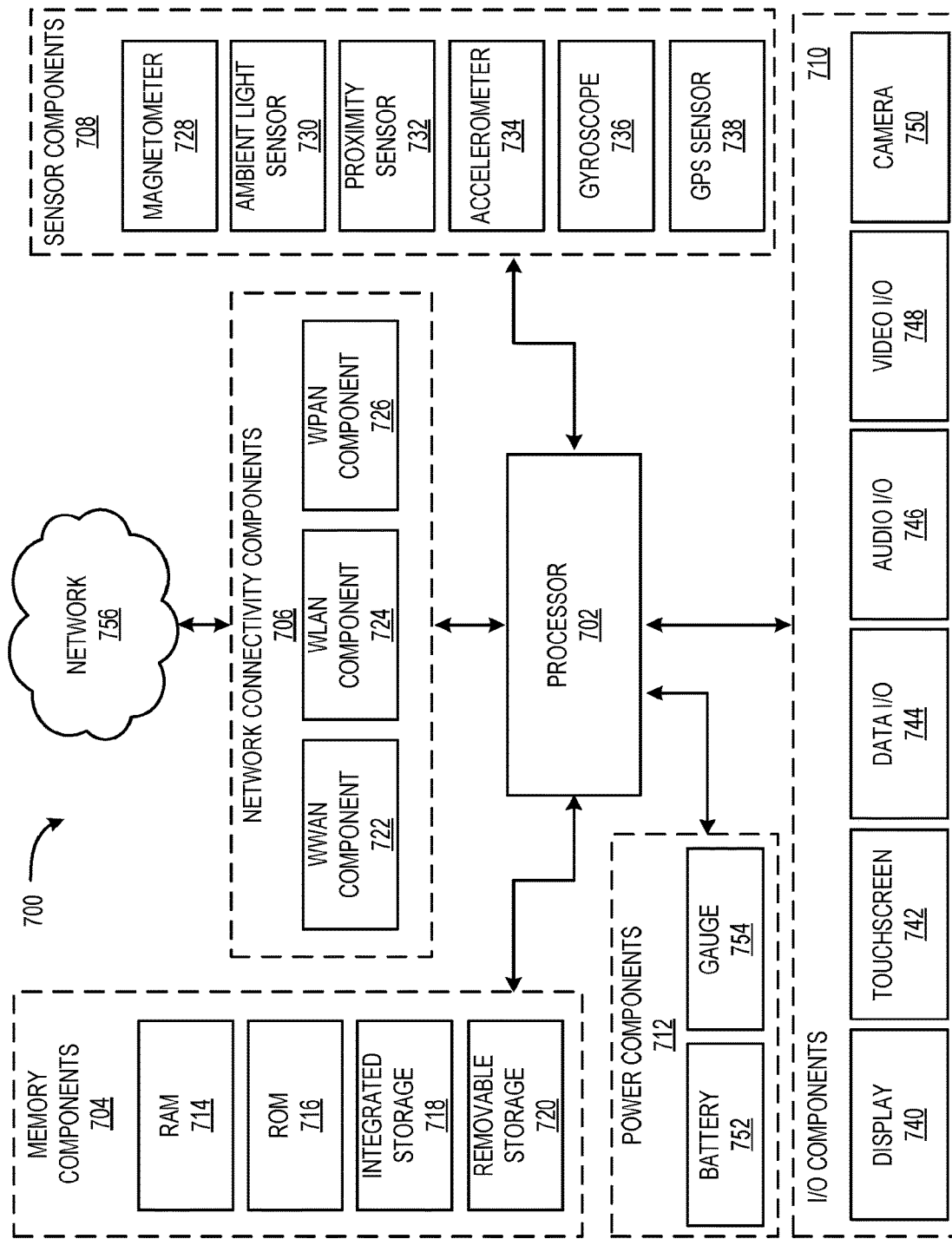
FIG. 7 is a computer architecture diagram illustrating a computing device architecture for a computing device capable of implementing aspects of the techniques and technologies presented herein.

Turning now to FIG. 7, an illustrative computing device architecture 700 for a computing device that is capable of executing various software components is described herein for trust delegation. The computing device architecture 700 is applicable to computing devices such as mobile clients in vehicles. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 700 is applicable to the client device 110 and client/servers 120A-C shown in FIGS. 1, 2A-C, and computing device 606A-N shown in FIG. 6.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individual components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, secure data.

In some configurations, the processor 702 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, California and others. In some configurations, the processor 702 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSOFT AZURE from Microsoft Corporation of Redmond, Washington or AWS from Amazon Corporation of Seattle, Washington. The operating system may also include WINDOWS MOBILE OS from Microsoft Corporation of Redmond, Washington, WINDOWS PHONE OS from Microsoft Corporation, WINDOWS from Microsoft Corporation, MAC OS or IOS from Apple Inc. of Cupertino, California, and ANDROID OS from Google Inc. of Mountain View, California. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 756 of FIG. 7. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or be adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 602.11 standards, such as IEEE 602.11a, 602.11b, 602.11g, 602.11n, and/or future 602.11 standard (referred to herein collectively as WI-FI). Draft 602.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited to, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interfaces described below or may include processing functionality built-in to the processor 702.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The power components 712 may also include a power connector, which may be combined with one or more of the aforementioned I/O components 710. The power components 712 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following clauses:

Clause 1. A computer-implemented authorization delegation method for extension of OAuth multiple actor delegation, the method comprising: receiving a first authorization request from a subject client; responding to the first authorization by sending a first token having a first set of permissions to the subject client; receiving a second authorization request from a first partner actor, the second authorization request including the first token; responding to the second authorization request by: linking the first partner actor to the subject client in a trust stack pertaining to the subject client, and sending a second token to the first actor partner with a second set of permissions, where the second token comprises a first complex token that identifies the subject client and the first partner actor; receiving a third authorization request from a second partner actor, the third authorization request including the second token; responding to the third authorization request by: linking the second partner actor to the first partner actor in the trust stack, and sending a third token to the second actor partner with a third set of permissions, where the third token comprises a second complex token that identifies the first partner actor and the second partner actor.

Clause 2. The method of Clause 1, the method including: receiving an access request to a resource from the second partner actor, the access request including the third token; and granting access to the resource based on the third set of permissions.

Clause 3. The method of Clause 2, the method including: determining the second set of permissions based on either a union or intersection of permissions for the subject client and permissions for the first partner actor.

Clause 4. The method of Clause 3, the method including: determining the third set of permissions based on either a union or intersection of permissions for the subject client, permissions for the first partner actor, and permissions for the third partner actor.

Clause 5. The method of Clause 1, where the authorization delegation pertains to a financial transaction and: the first partner actor is not configured for compliance with a standard for secure handling of customer financial data; and the second partner actor is configured for compliance with the standard for secure handling of customer financial data.

Clause 6. The method of Clause 1, where: the subject client comprises an end user; the first partner actor comprises a service provider to the end user; and the second partner actor comprises a subcontractor to the first partner.

Clause 7. The method of Clause 6, where: the second partner actor is configured to provide one or more of shipping, packaging, warehousing and insurance to the first partner.

Clause 8. A system for trust delegation, the system comprising: one or more processors; and one or more memory devices in communication with the one or more processors, the memory devices having computer-readable instructions stored thereupon that, when executed by the processors, cause the processors to: receive a first authorization request from a subject client; respond to the first authorization by sending a first token having a first set of permissions to the subject client; receive a second authorization request from a first partner actor, the second authorization request including the first token; respond to the second authorization request by: linking the first partner actor to the subject client in a trust stack pertaining to the subject client, and sending a second token to the first actor partner with a second set of permissions, where the second token comprises a first complex token that identifies the subject client and the first partner actor; receive a third authorization request from a second partner actor, the third authorization request including the second token; respond to the third authorization request by: linking the second partner actor to the first partner actor in the trust stack, and sending a third token to the second actor partner with a third set of permissions, where the third token comprises a second complex token that identifies the first partner actor and the second partner actor.

Clause 9. The system of Clause 8, the system including stored instructions that, when executed by the processors, cause the processors to: receive an access request to a resource from the second partner actor, the access request including the third token; and grant access to the resource based on the third set of permissions.

Clause 10. The system of Clause 9, the system including stored instructions that, when executed by the processors, cause the processors to: determine the second set of permissions based on either a union or intersection of permissions for the subject client and permissions for the first partner actor Clause 11. The system of Clause 10, the system including stored instructions that, when executed by the processors, cause the processors to: determine the third set of permissions based on either a union or intersection of permissions for the subject client, permissions for the first partner actor, and permissions for the third partner actor.

Clause 12. The system of Clause 8, where the authorization delegation pertains to a financial transaction and: the first partner actor is not configured to comply with a standard for secure handling of customer financial data; and the second partner actor is configured to comply with the standard for secure handling of customer financial data.

Clause 13. The method of Clause 8, where: the subject client comprises an end user; the first partner actor comprises a service provider to the end user; and the second partner actor comprises a subcontractor to the first partner.

Clause 14. The system of Clause 13, where: the second partner actor is configured to provide one or more of shipping, packaging, warehousing and insurance to the first partner.

Clause 15. A computer storage medium having computer executable instructions stored thereon which, when executed by one or more processors, cause the processors to execute an authorization delegation method for extension of OAuth multiple actor delegation, the method comprising: receiving a first authorization request from a subject client; responding to the first authorization by sending a first token having a first set of permissions to the subject client; receiving a second authorization request from a first partner actor, the second authorization request including the first token; responding to the second authorization request by: linking the first partner actor to the subject client in a trust stack pertaining to the subject client, and sending a second token to the first actor partner with a second set of permissions, where the second token comprises a first complex token that identifies the subject client and the first partner actor; receiving a third authorization request from a second partner actor, the third authorization request including the second token; responding to the third authorization request by: linking the second partner actor to the first partner actor in the trust stack, and sending a third token to the second actor partner with a third set of permissions, where the third token comprises a second complex token that identifies the first partner actor and the second partner actor.

Clause 16. The computer storage medium of Clause 15, the method including: receiving an access request to a resource from the second partner actor, the access request including the third token; and granting access to the resource based on the third set of permissions.

Clause 17. The computer storage medium of Clause 16, the method including: determining the second set of permissions based on either a union or intersection of permissions for the subject client and permissions for the first partner actor.

Clause 18. The computer storage medium of Clause 17, the method including: determining the third set of permissions based on either a union or intersection of permissions for the subject client, permissions for the first partner actor, and permissions for the third partner actor.

Clause 19. The computer storage medium of Clause 15, where the authorization delegation pertains to a financial transaction and: the first partner actor is not configured for compliance with a standard for secure handling of customer financial data; and the second partner actor is configured for compliance with the standard for secure handling of customer financial data.

Clause 20. The computer storage medium of Clause 15, where: the subject client comprises an end user; the first partner actor comprises a service provider to the end user; and the second partner actor comprises a subcontractor to the first partner.

Clause 21. The computer storage medium of Clause 15, where: the subject client comprises an end user; the first partner actor comprises a service provider to the end user; and the second partner actor comprises a subcontractor to the first partner, where the second partner actor is configured to provide one or more of shipping, packaging, warehousing and insurance to the first partner.

What is claimed is:

1. A computer-implemented method comprising:
receiving a first authorization request from a subject client;
responding to the first authorization request by sending a first token having a first set of permissions to the subject client;
receiving a second authorization request from a first partner actor, the second authorization request including the first token;
responding to the second authorization request by:
linking the first partner actor to the subject client in a trust stack pertaining to the subject client, and
sending a second token to the first actor partner with a second set of permissions, wherein the second token identifies the subject client and the first partner actor;
receiving a third authorization request from a second partner actor, the third authorization request including the second token; and
responding to the third authorization request by:
linking the second partner actor to the first partner actor in the trust stack, and
sending a third token to the second partner actor with a third set of permissions, wherein the third token identifies the first partner actor and the second partner actor; and
wherein access to a resource of the subject client is delegated to the first partner actor or the second partner actor if requested.

2. The computer-implemented method of claim 1, wherein the method further comprises:
receiving an access request to a resource from the second partner actor, the access request including the third token; and
granting access to the resource based on the third set of permissions.

3. The computer-implemented method of claim 2, wherein the resource comprises user information associated with the subject client.

4. The computer-implemented method of claim 1, wherein the method further comprises:
determining the second set of permissions based on a union or an intersection of permissions for the subject client and permissions for the first partner actor.

5. The computer-implemented method of claim 1, wherein the method further comprises:
determining the third set of permissions based on one or more selected from the following: permissions for the subject client, permissions for the first partner actor, and permissions for the second partner actor.

6. The computer-implemented method of claim 1, wherein the first set of permissions, the second set of permissions, and the third set of permissions each allow access to one or more application programming interface (APIs).

7. The computer-implemented method of claim 1, wherein the method further comprises:
receiving a fourth authorization request from a third partner actor, the fourth authorization request including the third token; and
responding to the fourth authorization request by:
linking the third partner actor to the second partner actor in the trust stack, and
sending a fourth token to the third actor partner with a fourth set of permissions, where the fourth token identifies the second partner actor and the third partner actor.

8. One or more computer storage media storing computer-useable instructions that, when used by a computing device, cause the computing device to perform operations, the operations comprising:

issuing, to a client device, a first token having a first set of permissions;

in response to a first authorization request from a first partner server that includes the first token:
- linking the first partner server to the client device in a trust stack, and
- issuing, to the first partner server, a second token with a second set of permissions, wherein the second token identifies the client device and the first partner server; and in response to a second authorization request from a second partner server that includes the second token:
- linking the second partner server to the first partner server in the trust stack, and
- issuing, to the second partner server, a third token with a third set of permissions, wherein the third token identifies the first partner server and the second partner server; and wherein access to a resource of the client device is delegated to the first partner server or the second partner server if requested.

9. The one or more computer storage media of claim 8, wherein the operations further comprise:
receiving an access request to a resource from the second partner server, the access request including the third token; and
granting access to the resource based on the third set of permissions.

10. The one or more computer storage media of claim 9, wherein the resource comprises user information associated with the client device.

11. The one or more computer storage media of claim 8, wherein the operations further comprise:
determining the second set of permissions based on a union or an intersection of permissions for the client device and permissions for the first partner server.

12. The one or more computer storage media of claim 8, wherein the operations further comprise:
determining the third set of permissions based on one or more selected from the following: permissions for the client device, permissions for the first partner server, and permissions for the second partner server.

13. The one or more computer storage media of claim 8, wherein the first set of permissions, the second set of permissions, and the third set of permissions each allow access to one or more application programming interface (APIs).

14. The one or more computer storage media of claim 8, wherein the operations further comprise:
in response to a third authorization request from a third partner server that includes the third token:
- linking the third partner server to the second partner server in the trust stack, and
- issuing, to the third partner server, a fourth token with a fourth set of permissions, wherein the fourth token identifies the second partner server and the third partner server.

15. A computer system comprising:
a processor; and
a computer storage medium storing computer-useable instructions that, when used by the processor, causes the computer system to perform operations comprising:
issuing, to a client, a first token having a first set of permissions;

in response to a first authorization request from a first partner that includes the first token:
- linking the first partner to the client in a trust stack, and
- issuing, to the first partner, a second token with a second set of permissions, wherein the second token identifies the client and the first partner; and in response to a second authorization request from a second partner that includes the second token:
- linking the second partner to the first partner in the trust stack, and
- issuing, to the second partner, a third token with a third set of permissions, wherein the third token identifies the first partner and the second partner; and wherein access to a resource of the client is delegated to the first partner or the second partner if requested.

16. The computer system of claim 15, wherein the operations further comprise:
receiving an access request to a resource from the second partner, the access request including the third token; and
granting access to the resource based on the third set of permissions.

17. The computer system of claim 16, wherein the resource comprises user information associated with the client.

18. The computer system of claim 15, wherein the operations further comprise:
determining the second set of permissions based on a union or an intersection of permissions for the client and permissions for the first partner.

19. The computer system of claim 15, wherein the operations further comprise:
determining the third set of permissions based on one or more selected from the following: permissions for the client, permissions for the first partner, and permissions for the second partner.

20. The computer system of claim 15, wherein the first set of permissions, the second set of permissions, and the third set of permissions each allow access to one or more application programming interface (APIs).

* * * * *